(12) United States Patent
Griffin et al.

(10) Patent No.: US 12,284,217 B2
(45) Date of Patent: Apr. 22, 2025

(54) CROSS-DOMAIN DATA ACCESS

(71) Applicant: Red Hat, Inc., Raleigh, NC (US)

(72) Inventors: Leigh Griffin, Waterford (IE); Andrea Cosentino, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 209 days.

(21) Appl. No.: 17/949,573

(22) Filed: Sep. 21, 2022

(65) Prior Publication Data

US 2024/0098116 A1 Mar. 21, 2024

(51) Int. Cl.
*H04L 9/40* (2022.01)
*G06F 16/27* (2019.01)
*G06F 21/62* (2013.01)

(52) U.S. Cl.
CPC .......... *H04L 63/20* (2013.01); *G06F 21/6218* (2013.01); *G06F 16/275* (2019.01)

(58) Field of Classification Search
CPC ..... H04L 63/20; G06F 21/6218; G06F 16/275
See application file for complete search history.

(56) References Cited

U.S. PATENT DOCUMENTS

| | | | |
|---|---|---|---|
| 9,251,114 B1 | 2/2016 | Ancin et al. | |
| 9,817,832 B1* | 11/2017 | Protopopov | .......... G06F 16/128 |
| 10,237,253 B2 | 3/2019 | Chen | |
| 10,275,328 B2 | 4/2019 | Antony et al. | |
| 10,530,775 B2 | 1/2020 | Pogrebinsky | |
| 10,554,646 B2 | 2/2020 | Hussain et al. | |
| 10,812,543 B1* | 10/2020 | Chakravorty | ........... H04L 65/61 |
| 2002/0184524 A1* | 12/2002 | Steele | ................. H04L 41/0686 726/2 |
| 2022/0066993 A1* | 3/2022 | Khanuja | ................. G06F 16/27 |

FOREIGN PATENT DOCUMENTS

CN 109726250 B 1/2020
CN 111741135 B 12/2020

* cited by examiner

*Primary Examiner* — Theodore C Parsons
(74) *Attorney, Agent, or Firm* — Dority & Manning, P.A.

(57) ABSTRACT

A cross-domain data access service enables data access across two or more computing domains, such as, for example, transient access by a public device to data held in a private cloud. In particular, the cross-domain data access service can identify a data subset from within a secure datastore of a first computing domain. The cross-domain data access service can replicate the data subset within a transient datastore that is segregated from the secured datastore. The cross-domain data access service can implement a data access policy so as to enable a client device from a second domain to access the transient datastore.

20 Claims, 6 Drawing Sheets

CROSS-DOMAIN DATA ACCESS

BACKGROUND

A computing domain can refer to an interconnected collection of computing devices and related components such as databases, peripherals, networking components, or similar. In certain settings, data may be accessible by devices associated with a certain computing domain but inaccessible to devices not included within the computing domain. One example of such a situation is a private cloud network, where devices on the private cloud network may access data held within the private cloud. However, devices on a public cloud network may not access the data from the private cloud.

SUMMARY

The examples disclosed herein implement a cross-domain data access service that enables data access across two or more computing domains, such as, for example, transient access by a public device to data held in a private cloud. In particular, the cross-domain data access service can identify a data subset from within a secure datastore of a first computing domain. The cross-domain data access service can replicate the data subset within a transient datastore that is segregated from the secured datastore. The cross-domain data access service can implement a data access policy so as to enable a client device from a second domain to access the transient datastore. For example, the data access policy can specify certain characteristics of the data storage and/or data access, such as acceptable access interfaces, encryption characteristics, timing of access, role-based access controls, or similar.

In one example, a method for cross-domain data access is disclosed. The method comprises identifying, by a computing system comprising one or more computing devices and based on a data description, a data subset from a secured data set stored in a secured datastore associated with a first computing domain. The method comprises generating, by the computing system, a replicated data subset in a transient datastore that is segregated from the secured datastore, the replicated data subset in the transient datastore being a replica of the data subset from the secured data set stored in the secured datastore. The method comprises enabling, by the computing system, a client device associated with a second computing domain to access the replicated data subset in the transient datastore according to a data access policy. The method comprises determining, by the computing system, that an expiration condition specified by the data access policy has occurred. The method comprises, in response to determining, by the computing system, that the expiration condition specified by the data access policy has occurred, terminating, by the computing system, access to the replicated data subset in the transient datastore.

In another example, a computing system for cross-domain data access is disclosed. The computing system comprises one or more computing devices. The one or more computing devices are to identify, based on a data description, a data subset from a secured data set stored in a secured datastore associated with a first computing domain. The one or more computing devices are to generate a replicated data subset in a transient datastore that is segregated from the secured datastore, the replicated data subset in the transient datastore being a replica of the data subset from the secured data set stored in the secured datastore. The one or more computing devices are to enable a client device associated with a second computing domain to access the replicated data subset in the transient datastore according to a data access policy. The one or more computing devices are to determine that an expiration condition specified by the data access policy has occurred. In response to determination that the expiration condition specified by the data access policy has occurred, the one or more computing devices are to terminate access to the replicated data subset in the transient datastore.

In another example, a non-transitory computer-readable medium is disclosed. The non-transitory computer-readable medium stores thereon computer-executable instructions that, when executed, cause one or more processor devices to identify, based on a data description, a data subset from a secured data set stored in a secured datastore associated with a first computing domain. The instructions cause the one or more processor devices to generate a replicated data subset in a transient datastore that is segregated from the secured datastore, the replicated data subset in the transient datastore being a replica of the data subset from the secured data set stored in the secured datastore. The instructions cause the one or more processor devices to enable a client device associated with a second computing domain to access the replicated data subset in the transient datastore according to a data access policy. The instructions cause the one or more processor devices to determine that an expiration condition specified by the data access policy has occurred. The instructions cause the one or more processor devices to, in response to determination that the expiration condition specified by the data access policy has occurred, terminate access to the replicated data subset in the transient datastore.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
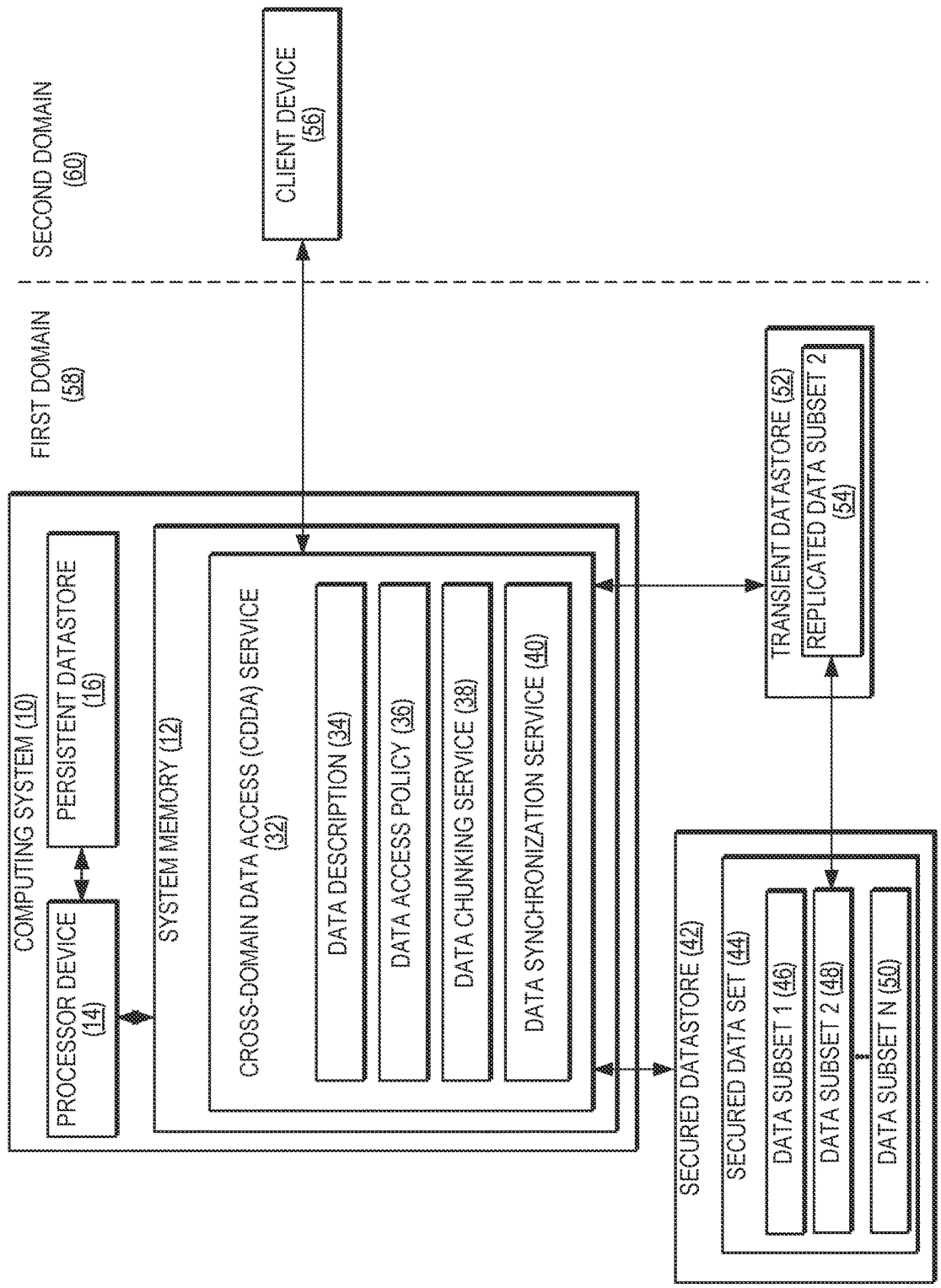
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Data held by or in a particular computing domain can be private to that computing domain. That is, the data may be secured against access by devices that are not included within the computing domain. For example, data in an internal network or private cloud may be inaccessible to devices that are not included in the private cloud, such as devices on a public cloud. The private cloud can execute various data synchronization approaches to ensure both redundancy and access to permitted domain members.

One challenge with this paradigm is that, in certain settings, it may be desirable to selectively share a subset of the secured data for various reasons. For example, some of the secured data might be required for a public transaction (e.g., in a time limited manner). Similarly, some public data might need to be ingested or otherwise synchronized into the private data, but in a more controlled manner. One example situation in which selective sharing of private data may be desirable is the sharing of a customer's private service manifest files or logfiles with a service provider so that the service provider may analyze the files and provide information technology support. Common approaches to this challenge such as use of a bearer token or providing full access to multitenant datastore do not offer sufficient guarantees of isolating the complete data from limited, trusted users.

In view of the challenges described above, the examples disclosed herein implement a cross-domain data access service that enables cross-domain data access. The cross-domain data access service can enable data access across two or more computing domains, such as, for example, transient access by a public device to data held in a private cloud. Thus, the cross-domain data access service can expose a subset of secured data to a client device from a different domain, in a manner that is consistent and that does not expose more than necessary.

In particular, the cross-domain data access service can operate to enable limited access to a subset of secured data associated with a first domain, such as a private domain. For example, the cross-domain data access service can receive a data description and a data access policy from an administrator of the first domain.

The cross-domain data access service can identify a data subset from a secure dataset stored in a secure datastore of a first computing domain based on the data description. The cross-domain data access service can replicate the data subset within a transient datastore that is segregated from the secured datastore. For example, the transient datastore can be one or both of physically isolated and logically isolated from the secured datastore.

The cross-domain data access service can implement the data access policy so as to enable a client device from a second domain (e.g., a public domain) to access the transient datastore. For example, the data access policy can specify certain characteristics of the data storage and/or data access, such as acceptable access interfaces, encryption characteristics, timing of access, role-based access controls, or similar. Thus, requests by a client device to access the data subset can be approved or denied based on whether the request satisfies the data access policy.

In addition, in some implementations, a synchronization connector can be established between the secured datastore and the transient datastore. The synchronization connector can continue to synchronize additional changes from the secured datastore for the time period the data is available to the client device(s) specified by the data access policy.

In some implementations, the cross-domain data access service can also enable data from the second domain to be ingested or transferred to the transient datastore. Data received from the second domain can be held in the transient datastore and evaluated for correctness, compatibility, security concerns, or the like before being introduced into the secured datastore.

Then, when an expiration condition specified by the data access policy occurs, the ownership of the data can revert to the secured datastore or access to the client can otherwise be terminated. As examples, the expiration condition can include a maximum access time being reached, a maximum number of access requests being reached, a maximum volume of data transfer being reached, or similar.

As such, the proposed techniques represent an improvement in computer technology. In particular, the cross-domain data access service enables efficient, privacy-preserving access to selected data across multiple domains, thereby improving the functioning of a computer system. As one example, the proposed techniques allow data synchronization on a subset of a data set, thereby allowing public cloud access to targeted data resources that are potentially behind a firewall, but only on a narrow defined chunk of the data set and for a temporary, specified timeframe.

FIG. 1 is a block diagram of a computing system 10. The computing system 10 can be implemented by one or more computing devices. The computing system 10 comprises a system memory 12 and a processor device 14. The computing system 10 further comprises a persistent datastore 16 (e.g., a hard drive or Solid State Drive (SSD), as non-limiting examples). It is to be understood that the computing system 10 in some examples may include constituent elements in addition to those illustrated in FIG. 1.

The computing system 10 of FIG. 1 implements a cross-domain data access service (CDDA) 32 that enables data access across two or more different computing domains. For example, the CDDA service 32 can enable data access across a first computing domain 58 and a second computing domain 60. As examples, the first computing domain 58 can correspond to a private cloud network and the second computing domain 60 can correspond to a public cloud network.

The first domain 58 can include a secured datastore 42. The secured datastore 42 can store a secured data set 44. The secured datastore 42 and the secured data set 44 can be secured against access by non-permitted devices or entities. For example, various encryption techniques, access controls, passwords, network security techniques, or similar can be used to secure the secured datastore 42 and the secured data set 44 against non-permitted access.

The secured data set 44 can include a number of data subsets. For example, as illustrated in FIG. 1, the secured data set 44 can include data subset 1 46, data subset 2 48, through data subset N 50. The data subsets 46-50 can correspond to different rows or columns in a table or database (e.g., a SQL database), different files, different tables, different objects in a graph, different files, or other divisions of the larger secured data set 44. As one example, the data subsets 46-50 can correspond to a set of user logs, such as private service manifest files or logfiles. The data subsets 46-50 may be stored together or may be stored separately.

To facilitate data access across domains, the CDDA service 32 can receive a data description 34 and a data access policy 36. For example, the data description 34 and the data access policy 36 can be prepared and/or provided by an administrator of the first domain 58 and/or other party that has permission to share from the secured data set 44. The data description 34 can provide a description of a subset of the secured data set 44 that is desired to be shared across domains (e.g., to the second domain 60). As one example, the data description 34 can specify that data subset 2 48 (but not data subset 1 46) is desired to be shared. The data description 34 can specify the data subset to be shared in a number of different ways or along any number of different features or axes. For example, the data description 34 may indicate that all log files from the last 24 hours that pertain to a certain username may be shared.

The CDDA service 32 can identify the data to be shared (e.g., the data subset 2 48) based on the data description 34. In particular, a data chunking service 38 of the CDDA service 32 can evaluate the data description 34 against the secured data set 44 to identify the data to be shared. As one example, the data description 34 may be expressed as a query in a query language and the data chunking service 38 can evaluate the query against the secured data set 44 to identify the data subset 2 48.

The CDDA service 32 can generate a replicated data subset 2 54 within a transient datastore 52 that is segregated from the secured datastore 42. For example, the transient datastore 52 can be one or both of physically isolated and logically isolated from the secured datastore 42. The transient datastore 52 can be located in the first domain 58 or outside of the first domain 58 (e.g., in the second domain 60).

In particular, a data synchronization service 40 can generate the replicated data subset 2 54 in the transient datastore 54. The data synchronization service 40 can use various mechanisms to generate the replicated data subset 2 54, such as, for example, creating a copy of the data subset 2 48 in an alternative location (e.g., in the transient datastore 52), streaming the data subset 2 48 from the secured datastore 42 to the transient datastore 52, and/or other transfer mechanisms.

In addition, in some implementations, the data synchronization service 40 can establish a synchronization connector can be established between the secured datastore 42 and the transient datastore 52. The synchronization connector can continue to synchronize additional changes to the data subset 2 48 from the secured datastore 42 for the time period the data is available to the client device(s) specified by the data access policy 36. For example, the synchronization connector can continuously or periodically update the transient datastore 52 based on any changes to the secured datastore 42. Thus, in some implementations, the synchronization connector can be a continuously open data channel, which can be closed or halted when specified. As examples, the synchronization connector can be an rsync connector, Kafka connector, or other data replication capability.

In particular, the CDDA service 32 can implement the data access policy 36 to enable a client device 56 from the second domain 60 (e.g., a public domain) to access the transient datastore 52. For example, the data access policy 36 can specify certain characteristics of the data storage and/or data access for the replicated data subset 2 54, such as acceptable access interfaces, encryption characteristics, timing of access, role-based access controls, or similar. Thus, requests by the client device 56 to access the replicated data subset 2 54 can be approved or denied by the CDDA service 32 based on whether the request satisfies the data access policy 36. In some implementations, information (e.g., requests) transmitted between the client device 56 and the CDDA service 32 can be structured according to one or more pre-defined application programming interfaces (APIs).

As one example, in some implementations, the data access policy 36 can specify a set of one or more acceptable access interfaces for the replicated data subset 2 54. The CDDA service 32 can enable the client device 56 to access the replicated data subset 2 54 via only one of the acceptable access interfaces. As one example, the CDDA service 32 can enable the client device 56 to access the replicated data subset 2 54 via a publish/subscribe mechanism. For example, the CDDA service 32 can enable the client device 56 to access the replicated data subset 2 54 in the form of a Kafka topic or other datastream connection. As yet another example, the CDDA service 32 can enable the client device 56 to access the replicated data subset 2 54 in via a Java Database Connectivity (JDBC) connection, File Transfer Protocol (FTP), Secure Shell Protocol (SSH), web-based collaborative platform(s), or other access interfaces or mechanisms.

As another example, the data access policy 36 can specify time, identify, or usage validity characteristics. For example, the data access policy 36 can specify that the client device 56 may be limited to read-only access to the replicated data subset 2 54. In another example, the data access policy 36 can specify that the client device 56 may edit the replicated data subset 2 54. Thus, a request from the client device 56 to download, edit, or otherwise manipulate the replicated data subset 2 54 may be approved or denied based on the data access policy 36.

As another example, the data access policy 36 and/or the client device 56 can specify a set of one or more encryption characteristics or levels for the replicated data subset 2 54. The CDDA service 32 can encrypt/decrypt the replicated data subset 2 54 according to the specified set of one or more encryption characteristics or levels. In such fashion, the encryption characteristics or settings of the transient datastore 52 can be adjusted independently of the encryption characteristics or settings of the secured datastore 42, and vice versa.

In some implementations, the CDDA service 32 can also enable data from the second domain 60 to be ingested or transferred to the transient datastore 52. Data received from the second domain 60 can be held in the transient datastore 52 and evaluated for correctness, conflict or compatibility analysis, security concerns (e.g., virus screening), or the like before being introduced into the secured datastore 42. Thus, in some implementations, the imported data can be isolated and sanitized prior to introduction into the secured datastore 42.

The CDDA service 32 can periodically or continuously evaluate whether an expiration condition specified by the data access policy 36 has occurred. When an expiration condition has occurred, the ownership of the data can revert to the secured datastore 42 or access to the client device 56 can otherwise be terminated. For example, when an expiration condition has occurred, the CDDA service 32 can delete, wipe, or otherwise destroy the transient datastore 52, thereby ensuring that the replicated data subset 2 54 is no longer accessible outside of the terms of the data access policy 36.

As examples, the expiration condition can include a maximum access time being reached, a maximum number of access requests being reached, a maximum volume of data transfer being reached, or similar. Thus, in one example, determining that the expiration condition has occurred can include determining that a period of availability for the transient datastore has reached a predetermined end time specified by the data access policy. In another example, determining that the expiration condition has occurred can include determining that a number of access requests from the client device to the transient datastore has reached a predetermined maximum number of access requests specified by the data access policy. In yet another example, determining that the expiration condition has occurred can include determining that a volume of data accessed from the transient datastore by the client device has reached a predetermined maximum volume of data specified by the data access policy.

It is to be understood that, because the CDDA service 32 is a component of the computing system 10, functionality implemented by the CDDA service 32 may be attributed to the computing system 10 generally. Moreover, in examples where the CDDA service 32 comprises software instructions that program the processor device 14 to carry out functionality discussed herein, functionality implemented by the CDDA service 32 may be attributed herein to the processor device 14. It is to be further understood that while, for purposes of illustration only, the CDDA service 32 is depicted as a single component, the functionality implemented by the CDDA service 32 may be implemented in any number of components, and the examples discussed herein are not limited to any particular number of components.

Figure 2A:
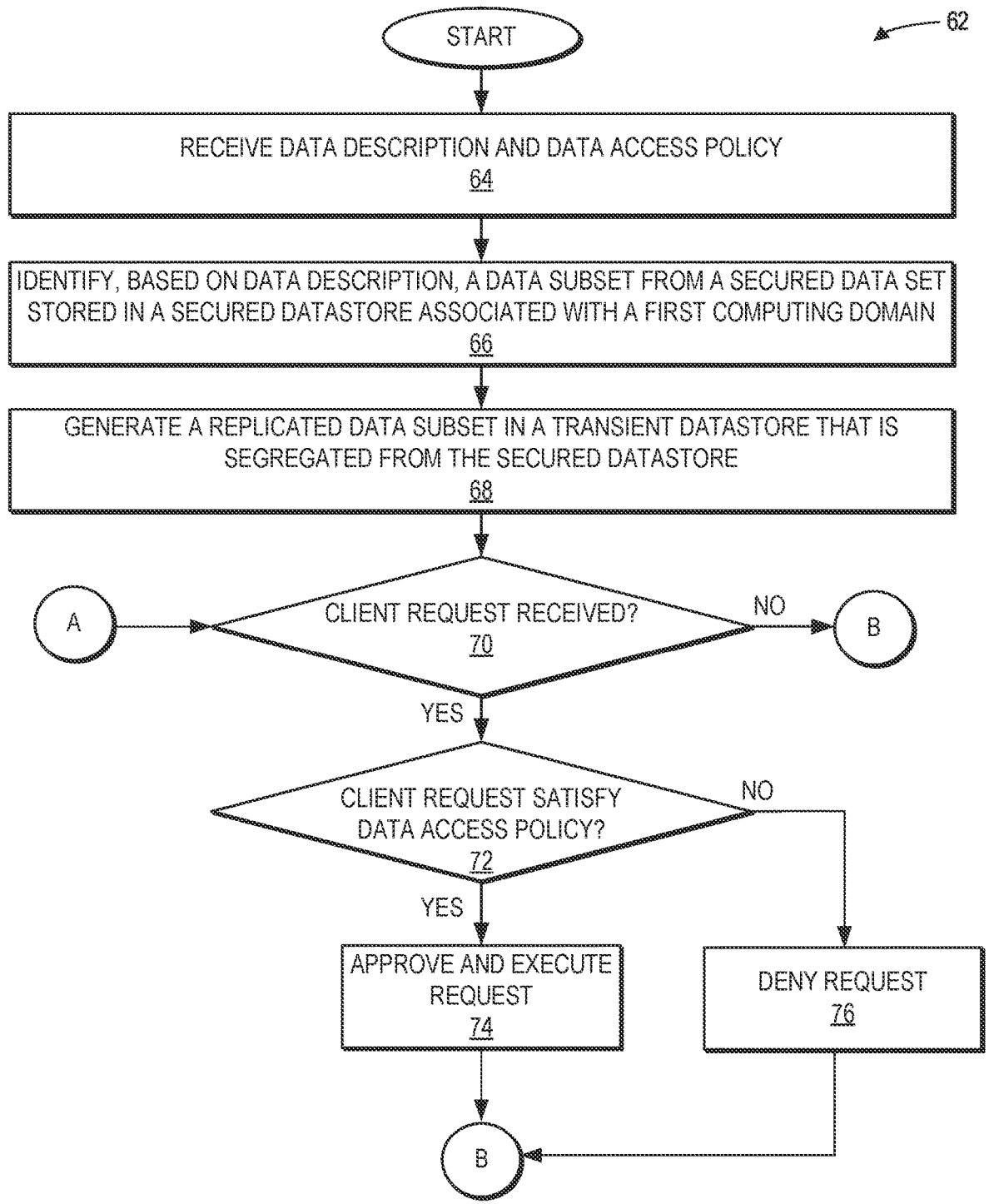
FIGS. 2A and 2B are flowcharts illustrating operations performed by the computing system of FIG. 1 for cross-domain data access, according to one example.
Figure 2B:
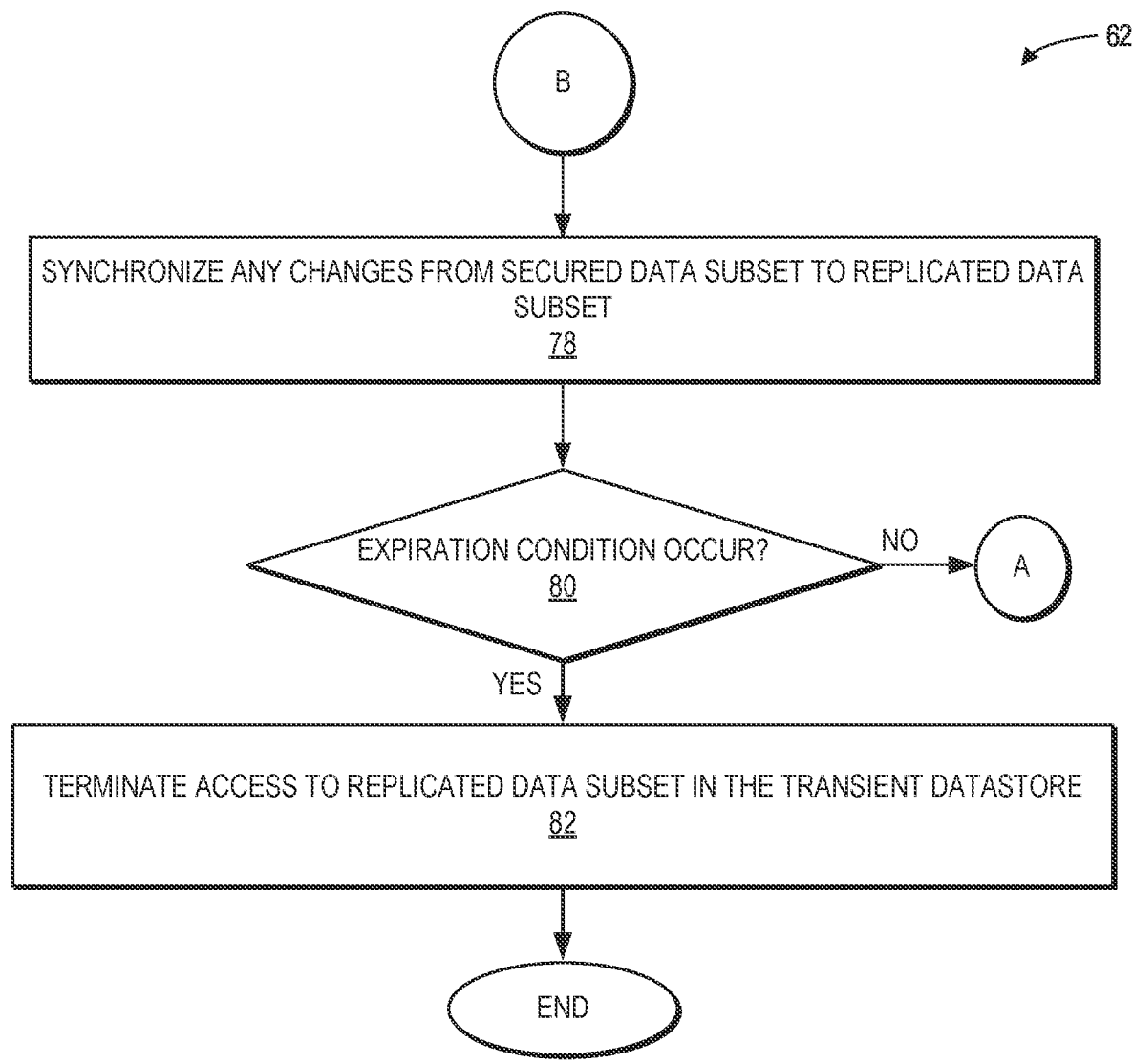

To illustrate example operations performed by the computing system 10 of FIG. 1 for enabling cross-domain data access, according to one example, FIGS. 2A and 2B provide a flowchart 62. Elements of FIG. 1 are referenced in describing FIGS. 2A and 2B for the sake of clarity.

In FIG. 2A, operations begin with a processor device of a computing device, such as the processor device 14 of the computing system 10 of FIG. 1. At 64, the processor device 14 receives a data description and a data access policy. For example, to facilitate data access across domains, the CDDA service 32 can receive a data description 34 and a data access policy 36. For example, the data description 34 and the data access policy 36 can be prepared and/or provided by an administrator of the first domain 58 and/or other party that has permission to share from the secured data set 44. The data description 34 can provide a description of a subset of the secured data set 44 that is desired to be shared across domains (e.g., to the second domain 60). As one example, the data description 34 can specify that data subset 2 48 (but not data subset 1 46) is desired to be shared. The data description 34 can specify the data subset to be shared in a number of different ways or along any number of different features or axes. For example, the data description 34 may indicate that all log files from the last 24 hours that pertain to a certain username may be shared.

At 66, the processor device 14 identifies, based on the data description, a data subset from a secured data set stored in a secured datastore associated with a first computing domain. For example, the CDDA service 32 can identify the data to be shared (e.g., the data subset 2 48) based on the data description 34. In particular, a data chunking service 38 of the CDDA service 32 can evaluate the data description 34 against the secured data set 44 to identify the data to be shared. As one example, the data description 34 may be expressed as a query in a query language and the data chunking service 38 can evaluate the query against the secured data set 44 to identify the data subset 2 48.

At 68, the processor device 14 generates a replicated data subset in a transient datastore that is segregated from the secured datastore. For example, the CDDA service 32 can generate a replicated data subset 2 54 within a transient datastore 52 that is segregated from the secured datastore 42. For example, the transient datastore 52 can be one or both of physically isolated and logically isolated from the secured datastore 42. The transient datastore 52 can be located in the first domain 58 or outside of the first domain 58 (e.g., in the second domain 60).

As one example, a data synchronization service 40 can generate the replicated data subset 2 54 in the transient datastore 54. The data synchronization service 40 can use various mechanisms to generate the replicated data subset 2 54, such as, for example, creating a copy of the data subset 2 48 in an alternative location (e.g., in the transient datastore 52), streaming the data subset 2 48 from the secured datastore 42 to the transient datastore 52, and/or other transfer mechanisms.

At 70, the processor device 14 determines whether a client request has been received from a client device. If no, then the flowchart proceeds to location B at FIG. 2B. However, referring still to FIG. 2A, if at 70, a client request has been received, then the flowchart proceeds to 72.

At 72, the processor device 14 determines whether the client request satisfies the data access policy. If yes, then the flowchart proceeds to 74 and the processor device approves the request. If no, then the flowchart proceeds to 76 and the processor device 14 denies the request.

As an example, the CDDA service 32 can implement the data access policy 36 to enable a client device 56 from the second domain 60 (e.g., a public domain) to access the transient datastore 52. For example, the data access policy 36 can specify certain characteristics of the data storage and/or data access for the replicated data subset 2 54, such as acceptable access interfaces, encryption characteristics, timing of access, role-based access controls, or similar. Thus, requests by the client device 56 to access the replicated data subset 2 54 can be approved or denied by the CDDA service 32 based on whether the request satisfies the data access policy 36. In some implementations, information (e.g., requests) transmitted between the client device 56 and the CDDA service 32 can be structured according to one or more pre-defined application programming interfaces (APIs).

As one example, in some implementations, the data access policy 36 can specify a set of one or more acceptable access interfaces for the replicated data subset 2 54. The CDDA service 32 can enable the client device 56 to access the replicated data subset 2 54 via only one of the acceptable access interfaces. As one example, the CDDA service 32 can enable the client device 56 to access the replicated data subset 2 54 via a publish/subscribe mechanism. For example, the CDDA service 32 can enable the client device 56 to access the replicated data subset 2 54 in the form of a Kafka topic or other datastream connection. As yet another example, the CDDA service 32 can enable the client device 56 to access the replicated data subset 2 54 in via a Java Database Connectivity (JDBC) connection, File Transfer Protocol (FTP), Secure Shell Protocol (SS H), web-based collaborative platform(s), or other access interfaces or mechanisms.

As another example, the data access policy 36 can specify time, identify, or usage validity characteristics. For example, the data access policy 36 can specify that the client device 56 may be limited to read-only access to the replicated data subset 2 54. In another example, the data access policy 36 can specify that the client device 56 may edit the replicated data subset 2 54. Thus, a request from the client device 56 to download, edit, or otherwise manipulate the replicated data subset 2 54 may be approved or denied based on the data access policy 36.

As another example, the data access policy 36 and/or the client device 56 can specify a set of one or more encryption characteristics or levels for the replicated data subset 2 54. The CDDA service 32 can encrypt/decrypt the replicated data subset 2 54 according to the specified set of one or more encryption characteristics or levels. In such fashion, the encryption characteristics or settings of the transient datastore 52 can be adjusted independently of the encryption characteristics or settings of the secured datastore 42, and vice versa.

Referring again to FIG. 2A, after 74 or 76, the flowchart proceeds to location B in FIG. 2B.

Referring now to FIG. 2B, at 78, the processor device 14 synchronizes any changes from the secured data subset to the replicated data subset. As one example, the data synchronization service 40 can establish a synchronization connector can be established between the secured datastore 42 and the transient datastore 52. The synchronization connector can continue to synchronize additional changes to the data subset 2 48 from the secured datastore 42 for the time period the data is available to the client device(s) specified by the data access policy 36. For example, the synchronization connector can continuously or periodically update the transient datastore 52 based on any changes to the secured datastore 42. Thus, in some implementations, the synchronization connector can be a continuously open data channel, which can be closed or halted when specified. As examples, the synchronization connector can be an rsync connector, Kafka connector, or other data replication capability.

At 80, the processor device 14 determines whether an expiration condition has occurred. If no, the flowchart returns to location A in FIG. 2A. However, referring still to 80, if yes, the flowchart proceeds to 82. The CDDA service 32 can periodically or continuously evaluate whether an expiration condition specified by the data access policy 36 has occurred. As examples, the expiration condition can include a maximum access time being reached, a maximum number of access requests being reached, a maximum volume of data transfer being reached, or similar. Thus, in one example, determining that the expiration condition has occurred can include determining that a period of availability for the transient datastore has reached a predetermined end time specified by the data access policy. In another example, determining that the expiration condition has occurred can include determining that a number of access requests from the client device to the transient datastore has reached a predetermined maximum number of access requests specified by the data access policy. In yet another example, determining that the expiration condition has occurred can include determining that a volume of data accessed from the transient datastore by the client device has reached a predetermined maximum volume of data specified by the data access policy.

At 82, the processor device 14 terminates access to the replicated data subset in the transient datastore. As an example, when an expiration condition has occurred, the ownership of the data can revert to the secured datastore 42 or access to the client device 56 can otherwise be terminated. For example, when an expiration condition has occurred, the CDDA service 32 can delete, wipe, or otherwise destroy the transient datastore 52, thereby ensuring that the replicated data subset 2 54 is no longer accessible outside of the terms of the data access policy 36.

Figure 3:
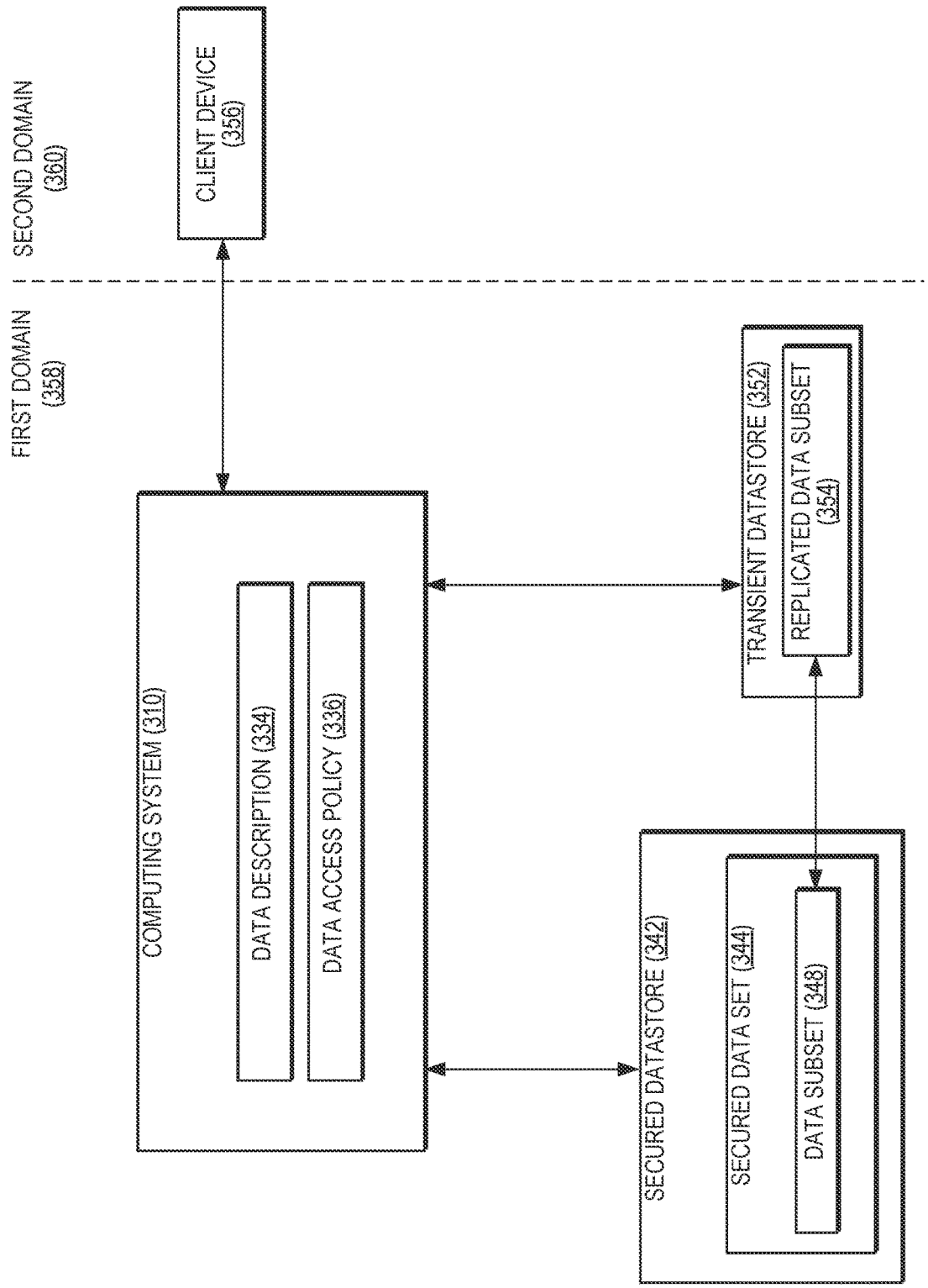
FIG. 3 is a simpler block diagram of the computing system of FIG. 1 for cross-domain data access, according to one example.

FIG. 3 is a simpler block diagram of the computing system 10 of FIG. 1 for cross-domain data access, according to one example. In the example of FIG. 3, a computing system 310 can include one or more computing devices. The computing system 310 identifies, based on a data description 334, a data subset 348 from a secured data set 344 stored in a secured datastore 342 associated with a first computing domain 358. The computing system 310 generates a replicated data subset 354 in a transient datastore 352 that is segregated from the secured datastore 342. The replicated data subset 354 in the transient datastore 352 is a replica of the data subset 348 from the secured data set 344 stored in the secured datastore 342. The computing system 310 enables a client device 356 associated with a second computing domain 360 to access the replicated data subset 354 in the transient datastore 352 according to a data access policy 336. The computing system 310 determines that an expiration condition specified by the data access policy 336 has occurred. In response to determination that the expiration condition specified by the data access policy 336 has occurred, the computing system 310 terminates access to the replicated data subset 354 in the transient datastore 352.

Figure 4:
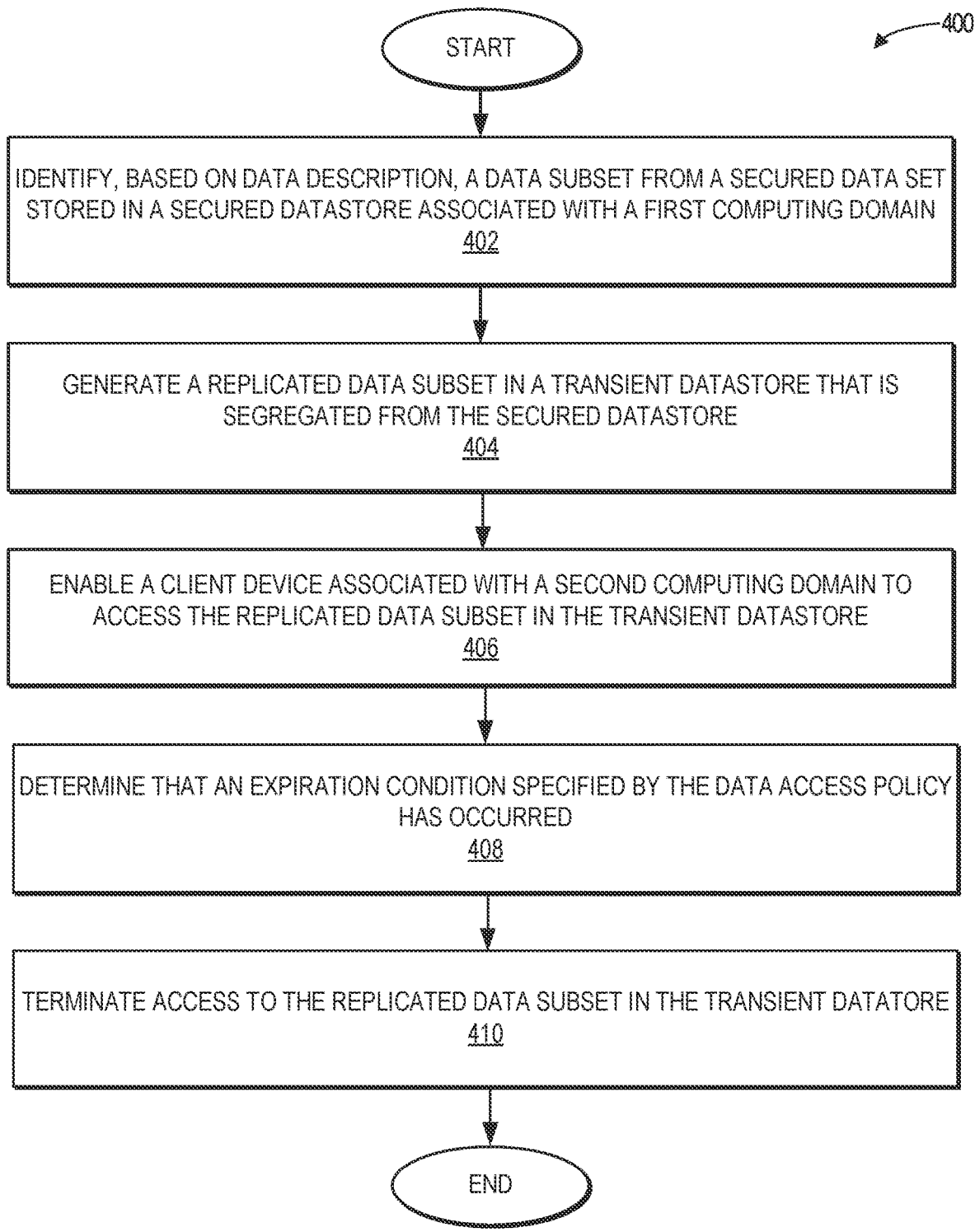
FIG. 4 is a flowchart of a simplified method for cross-domain data access by the computing system of FIG. 3, according to one example.

FIG. 4 provides a flowchart 400 of a simplified method for cross-domain data access by the computing system 310 of FIG. 3, according to one example. For the sake of clarity, elements of FIG. 3 are referenced in describing FIG. 4. Operations in FIG. 4 begin at 402. At 402, the computing system 310 identifies, based on a data description 334, a data subset 348 from a secured data set 344 stored in a secured datastore 342 associated with a first computing domain 358. At 404, the computing system 310 generates a replicated data subset 354 in a transient datastore 352 that is segregated from the secured datastore 342. The replicated data subset 354 in the transient datastore 352 is a replica of the data subset 348 from the secured data set 344 stored in the secured datastore 342. At 406, the computing system 310 enables a client device 356 associated with a second computing domain 360 to access the replicated data subset 354 in the transient datastore 352 according to a data access policy 336. At 408, the computing system 310 determines that an expiration condition specified by the data access policy 336 has occurred. At 410, in response to determination that the expiration condition specified by the data access policy 336 has occurred, the computing system 310 terminates access to the replicated data subset 354 in the transient datastore 352.

Figure 5:
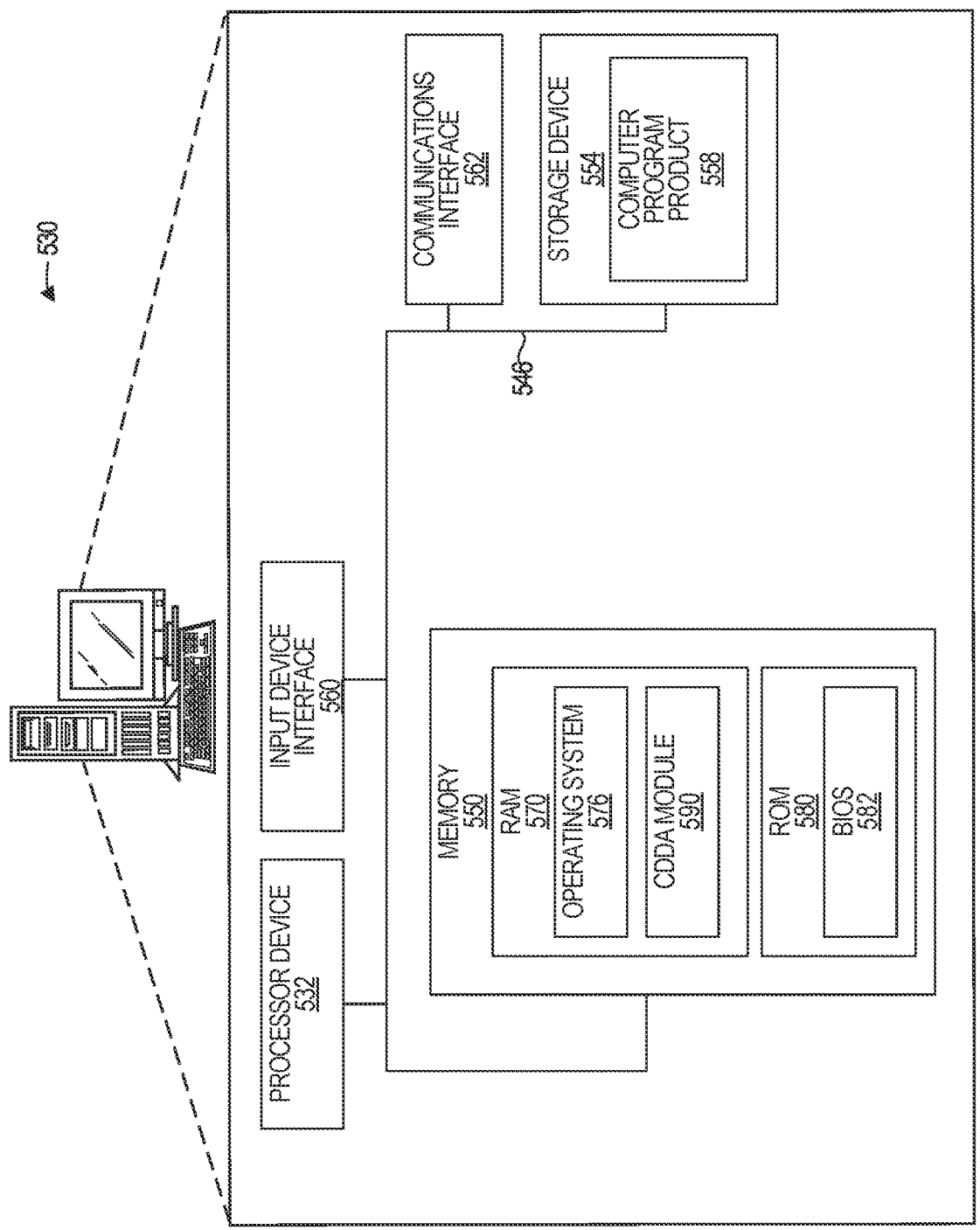
FIG. 5 is a block diagram of a computing device suitable for implementing examples, according to one example.

FIG. 5 is a block diagram of a computing device 530 suitable for implementing examples according to one example (e.g., for use in implementing the computing system 10 of FIG. 1 or the computing system 310 of FIG. 3). The computing device 530 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 530 includes the processor device 532, the system memory 550, and a system bus 546. The system bus 546 provides an interface for system components including, but not limited to, the system memory 550 and the processor device 532. The processor device 532 can be any commercially available or proprietary processor.

The system bus 546 may be any of several types of bus structures that may further interconnect to a memory bus (with or without a memory controller), a peripheral bus, and/or a local bus using any of a variety of commercially available bus architectures. The system memory 550 may include non-volatile memory 580 (e.g., read-only memory (ROM), erasable programmable read-only memory (EPROM), electrically erasable programmable read-only memory (EEPROM), etc.), and volatile memory 570 (e.g., random-access memory (RAM)). A basic input/output system (BIOS) 582 may be stored in the non-volatile memory 580 and can include the basic routines that help to transfer information between elements within the computing device 530. The volatile memory 570 may also include a high-speed RAM, such as static RAM, for caching data.

The computing device 530 may further include or be coupled to a non-transitory computer-readable storage medium such as the storage device 554, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 554 and other drives associated with computer-readable media and computer-usable media may provide non-volatile storage of data, data structures, computer-executable instructions, and the like, such as computer program product 558.

A number of modules can be stored in the storage device 554 and in the volatile memory 570, including an operating system 576 and one or more program modules, such as the cross-domain data access (CDDA) module 590, which may implement the functionality described herein in whole or in part. All or a portion of the examples may additionally or alternatively be implemented as a computer program product 558 stored on a transitory or non-transitory computer-usable or computer-readable storage medium, such as the storage device 554, which includes complex programming instructions, such as complex computer-readable program code, to cause the processor device 532 to carry out the steps described herein. Thus, the computer-readable program code 558 can comprise software instructions for implementing the functionality of the examples described herein when executed on the processor device 532. The processor device 532, in conjunction with the CDDA module 590 in the volatile memory 570, may serve as a controller, or control system, for the computing device 530 that is to implement the functionality described herein.

An operator, such as a user, may also be able to enter one or more configuration commands through a keyboard (not illustrated), a pointing device such as a mouse (not illustrated), or a touch-sensitive surface such as a display device. Such input devices may be connected to the processor device 532 through an input device interface 560 that is coupled to the system bus 546 but can be connected by other interfaces such as a parallel port, an Institute of Electrical and Electronic Engineers (IEEE) 1394 serial port, a Universal Serial Bus (USB) port, an IR interface, and the like. The computing device 530 may also include the communications interface 562 suitable for communicating with a network as appropriate or desired. The computing device 530 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method comprising:
identifying, by a computing system comprising one or more computing devices and based on a data description, a data subset from a secured data set stored in a secured datastore associated with a first computing domain, the data subset comprising a proper subset of the secured data set;
generating, by the computing system, a replicated data subset in a transient datastore that is segregated from the secured datastore, the replicated data subset in the transient datastore being a replica of the data subset from the secured data set stored in the secured datastore;
enabling, by the computing system, a client device associated with a second computing domain to access the replicated data subset in the transient datastore according to a data access policy, the data access policy identifying the client device and identifying access rights of the client device with respect to the replicated data subset, and identifying an expiration condition upon the occurrence of which access to the replicated data subset by the client device is to be terminated;
determining, by the computing system, that the expiration condition specified by the data access policy has occurred; and
in response to determining, by the computing system, that the expiration condition specified by the data access policy has occurred, terminating, by the computing system, access to the replicated data subset in the transient datastore.

2. The method of claim 1, wherein the transient datastore is physically segregated from the secured datastore.

3. The method of claim 1, wherein the transient datastore is logically segregated from the secured datastore.

4. The method of claim 1, further comprising:
automatically synchronizing, by the computing system, the replicated data subset in the transient datastore with the data subset in the secured datastore, wherein automatically synchronizing comprises replicating one or more changes to the data subset in the secured datastore into the replicated data subset in the transient datastore.

5. The method of claim 1, further comprising:
automatically synchronizing, by the computing system, the replicated data subset in the transient datastore with the data subset in the secured datastore, wherein automatically synchronizing comprises establishing a synchronization connector from the secured datastore to the transient datastore.

6. The method of claim 1, wherein the first computing domain comprises a private domain and the second computing domain comprises a public domain.

7. The method of claim 1, wherein enabling, by the computing system, the client device to access the replicated data subset comprises:

receiving, by the computing system and from the client device, a request to access the data subset in the secured datastore or the replicated data subset in a transient datastore;

evaluating, by the computing system, the data access policy to determine whether the request satisfies the data access policy; and when the request satisfies the data access policy, enabling, by the computing system, the client device to access the replicated data subset from the transient datastore.

8. The method of claim 1, wherein:

the data access policy specifies a set of one or more acceptable access interfaces for the replicated data subset; and enabling, by the computing system, the client device to access the replicated data subset comprises enabling, by the computing system, the client device to access the replicated data subset via only one of the acceptable access interfaces.

9. The method of claim 1, wherein enabling, by the computing system, the client device to access the replicated data subset comprises enabling, by the computing system, the client device to access the replicated data subset via a publish/subscribe mechanism.

10. The method of claim 1, further comprising:

receiving, by the computing system, one or more encryption requirements for the replicated data subset specified by the client device;

wherein generating, by the computing system, the replicated data subset in the transient datastore comprises encrypting, by the computing system, the replicated data subset in accordance with the one or more encryption requirements specified by client device.

11. The method of claim 1, further comprising:

importing, by the computing system, one or more data elements from the second computing domain into the transient datastore.

12. The method of claim 1, further comprising:

receiving, by the computing system, one or more requested edits to the replicated data subset from the client device;

evaluating, by the computing system, the data access policy to determine whether edits to the replicated data subset from the client device are permitted; and when edits to the replicated data subset from the client device are permitted, editing, by the computing system, the replicated data subset according to the one or more requested edits.

13. The method of claim 1, wherein terminating, by the computing system, access to the replicated data subset in the transient datastore comprises destroying, by the computing system, the transient datastore.

14. The method of claim 1, wherein determining, by the computing system, that the expiration condition specified by the data access policy has occurred comprises:

determining, by the computing system, that a period of availability for the transient datastore has reached a predetermined end time specified by the data access policy;

determining, by the computing system, that a number of access requests from the client device to the transient datastore has reached a predetermined maximum number of access requests specified by the data access policy; or determining, by the computing system, that a volume of data accessed from the transient datastore by the client device has reached a predetermined maximum volume of data specified by the data access policy.

15. The method of claim 1, wherein identifying, by the computing system based on the data description, the data subset from the secured data set comprises identifying, by the computing system based on the data description, a set of user logs associated with a user of the first computing domain.

16. The method of claim 1, wherein the data description and the data access policy are specified by an administrator of the first computing domain.

17. A computer system, comprising:

one or more computing devices to:

identify, based on a data description, a data subset from a secured data set stored in a secured datastore associated with a first computing domain, the data subset comprising a proper subset of the secured data set;

generate a replicated data subset in a transient datastore that is segregated from the secured datastore, the replicated data subset in the transient datastore being a replica of the data subset from the secured data set stored in the secured datastore;

enable a client device associated with a second computing domain to access the replicated data subset in the transient datastore according to a data access policy, the data access policy identifying the client device and identifying access rights of the client device with respect to the replicated data subset, and identifying an expiration condition upon the occurrence of which access to the replicated data subset by the client device is to be terminated;

determine that the expiration condition specified by the data access policy has occurred; and in response to determination that the expiration condition specified by the data access policy has occurred, terminate access to the replicated data subset in the transient datastore.

18. The computer system of claim 17, wherein the transient datastore is one or both of: physically segregated from the secured datastore and logically segregated from the secured datastore.

19. The computer system of claim 17, wherein the one or more computing devices are further to:

automatically synchronize the replicated data subset in the transient datastore with the data subset in the secured datastore, wherein to automatically synchronize the replicated data subset in the transient datastore with the data subset in the secured datastore, the one or more computing devices are to one or both of:

establish a synchronization connector from the secured datastore to the transient datastore; and replicate one or more changes to the data subset in the secured datastore into the replicated data subset in the transient datastore.

20. A non-transitory computer-readable storage medium that includes executable instructions to cause one or more processor devices to:

identify, based on a data description, a data subset from a secured data set stored in a secured datastore associated with a first computing domain, the data subset comprising a proper subset of the secured data set;

generate a replicated data subset in a transient datastore that is segregated from the secured datastore, the replicated data subset in the transient datastore being a replica of the data subset from the secured data set stored in the secured datastore;

enable a client device associated with a second computing domain to access the replicated data subset in the transient datastore according to a data access policy, the data access policy identifying the client device and identifying access rights of the client device with respect to the replicated data subset, and identifying an expiration condition upon the occurrence of which access to the replicated data subset by the client device is to be terminated;

determine that the expiration condition specified by the data access policy has occurred; and in response to determination that the expiration condition specified by the data access policy has occurred, terminate access to the replicated data subset in the transient datastore.

* * * * *